United States Patent Office 3,421,141
Patented Jan. 7, 1969

3,421,141
SELF-ADJUSTING FILTER
Henry J. Meyerhoff, Houston, Tex., assignor to Huntec Limited, Toronto, Ontario, Canada
Continuation-in-part of application Ser. No. 479,426, Aug. 13, 1965. This application Oct. 16, 1967, Ser. No. 675,531
U.S. Cl. 340—15.5        7 Claims
Int. Cl. G01v 1/00; G01s 9/66; H03b 1/04

ABSTRACT OF THE DISCLOSURE

A filter whose parameters automatically adjust themselves to minimize noise degradation in a noisy signal $X_1$, being filtered. A second noisy signal $X_2$ with noise uncorrelated to that in signal $X_1$ is used as a reference. Signal $X_1$ is divided into a series of components; each component is multiplied by the difference between the filter output and signal $X_2$; the products are integrated, multiplied by their associated components, and these last products are added to produce the filter output signal.

---

This application is a continuation-in-part of my copending application S.N. 479,426 filed Aug. 13, 1965.

This invention relates to a variable parameter filter for filtering a noisy signal. More particularly, it relates to a self-adjusting variable parameter filter in which the parameters automatically seek optimum values so as to reduce the noise content in the output signal of the filter. Such filters are particularly useful in geophysics work, for example in seismic surveying of underwater terrain.

Electrical signals which contain amplitude information distributed across a range of frequencies frequently become degraded by noise during their transmission. For example, in underwater seismic surveying in which a seismic pulse is generated, reflected from the bottom and received at hydrophones, the received signal is often degraded by noise at the hydrophones. In ordinary seismic surveying other types of noise, e.g. from vehicles, is often present to degrade a received signal. In the processing of such signals, it is usually desirable to reduce the noise degradation of the pure signal in order to facilitate its interpretation.

One measure of the extent of noise degradation of a signal is the square of the difference in amplitude between the pure signal and the noisy signal averaged over a time interval. This measure may be termed the mean square error or degradation of the signal. In other words, if the pure signal is $s(t)$ and the noisy signal is $x(t)$, the mean square error of the pure signal is $$\overset{\text{Limit}}{T \longrightarrow \infty} \frac{1}{2T} \int_{-T}^{T} [s(t) - x(t)]^2 dt \quad (1)$$

This mean square error termed $\overline{e_x^2}$, is also commonly written as $$\overline{e_x^2} = \overline{[s-x]^2} \quad (2)$$

(The bar over the $[s-x]^2$ is simply a short hand method of writing the longer integral of Equation 1, i.e. of showing that the right hand side of Equation 2 is an average quantity. Averages over finite time intervals are normally adequate approximations to Equations 1 and 2.)

One way in which a noisy signal may be processed is to pass the signal through a filter, the purpose being to pass the desired signal through and to filter out as much of the noise as possible. The usual practice in filter construction is to construct a filter having fixed parameters which result in a filter frequency response matched generally to the amplitude versus frequency spectrum of the expected pure signal portion of the noisy signal. The present invention, however, provides a filter having variable parameters. The construction of the variable parameter filter is such that the parameters of the filter automatically seek values that will reduce the noise degradation of the filter output signal, as compared with the output signal noise degradation at other values of the parameters, provided that the frequency spectrum of the input signal is changing relatively slowly.

In a typical embodiment of the invention, the filter includes a first input for receiving an input signal $x_1$ to be filtered (signal $x_1$ being the desired pure signal degraded by random noise), a second input for receiving a reference signal $x_2$ (signal $x_2$ being the pure signal degraded by random noise uncorrelated with the random noise in signal $x_1$), and an output which supplies an output signal Z. The filter also includes generating means between the inputs and the output for generating the output signal Z. The generating means typically comprise (1) dividing means for dividing the signal $x_1$ into a plurality of component signals $y_1$ to $y_N$ each of a frequency band differing in part from the frequency band of the other component signals, (2) means for producing a difference signal equal to the difference between signals Z and $x_2$, (3) means for multiplying each component by the difference signal to produce product signals, (4) means for integrating each product signal to produce integrated signals (or coefficients), (5) means for multiplying each component signal $y_1$ to $y_N$ by its associated coefficient to produce weighted component signals, and (6) means for adding the weighted component signals to produce the output signal Z.

Further objects and advantages of the invention will appear from the following disclosure, taken together with the accompanying drawings, in which.

Figure 1:
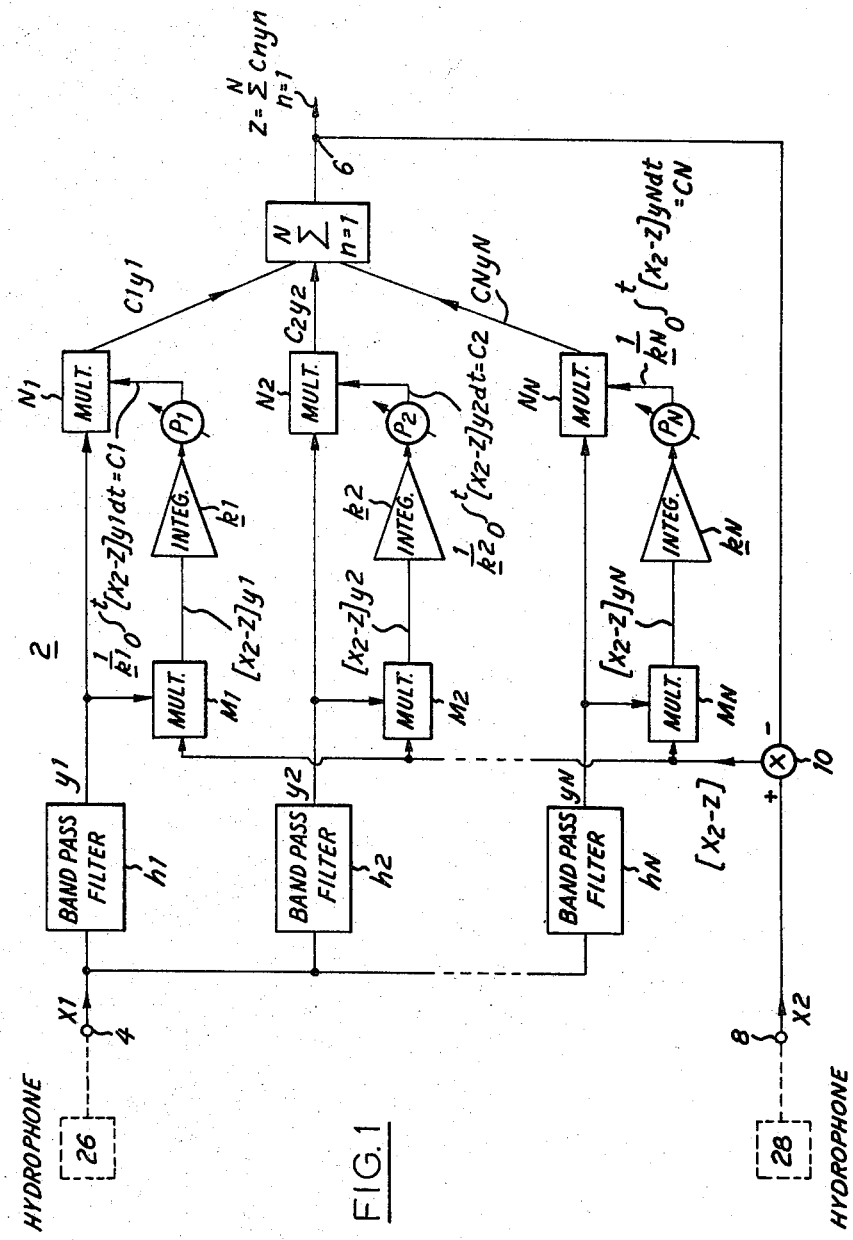
FIG. 1 illustrates in block diagram form a filter according to the present invention.

Reference is first made to FIG. 1, which shows a filter 2 constructed in accordance with the present invention. The filter 2 includes a first input terminal 4 to which an input signal $x_1$ to be filtered is applied, an output terminal 6 from which a filtered output signal Z is taken, and a second input terminal 8 to which a reference signal $x_2$ is applied.

It is assumed that the signal $x_1$ to be filtered is a noisy signal containing the desired pure signal s together with random noise. Reference signal $x_2$ is another noisy signal (of about the same amplitude as signal $x_1$) containing the desired pure signal s together with random noise that is uncorrelated with the noise in signal $x_1$.

Figure 2:
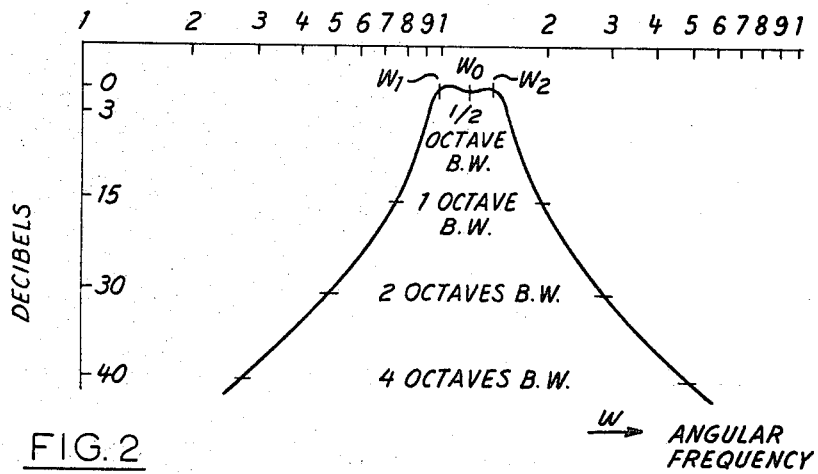
FIG. 2 shows a typical frequency response curve for one of the bandpass networks of the filter of FIG. 1.

Connected to the input terminal 4 of the filter are a number of bandpass networks $h_1, h_2 \cdots h_N$, the frequency response curve for a typical one of these networks being shown in FIG. 2. In the response curve of FIG. 2, the centre frequency is denoted by $w_0$ and the frequencies at which the response begins to fall off are denoted by $w_1$, $w_2$, those being the upper and lower limits of the relatively "flat" portion of the response curve. The centre frequencies of the response curves for the various bandpass networks are non-overlapping. The "flat" portions (as just described) of adjacent bandpass networks may overlap, but preferably are adjacent each other and non-overlapping, so that the bandpass networks subdivide the frequency spectrum of the input signal $x_1$ into a number of individual component signals $y_1, y_2 \cdots y_N$, each component signal covering a relatively discrete frequency band.

The output terminal 6 and second input terminal 8 of the filter are connected to opposite sides of a conventional subtracting network 10 which provides a difference signal $x_2-Z$. This difference signal is applied to multipliers $M_1, M_2 \cdots M_N$, as shown, to be multiplied by the respective components $y_1, y_2 \ldots y_N$. The multipliers thus yield output product signals $$[x_2-Z]y_1, [x_2-Z]y_2 \ldots [x_2-Z]y_N$$

These product signals are next integrated by integrators $k_1, k_2 \cdots k_N$. These integrators are conventional in construction, a typical circuit for integrator $k_n$ being diagrammatically shown in FIG. 3. As shown in FIG. 3, the integrator $k_n$ includes an operational amplifier $A_n$, an input resistor $R_n$, and a feedback capacitor $C_n$. The expression for the output voltage $v_0$, expressed in terms of the input voltage $v_1$, is standard and is given (assuming the usual high gain and bandwith for amplifier $A_n$) by $$v_0 = \frac{1}{R_n C_n} \int_0^t v_i dt$$

(assuming that at time $t=0$, $v_0=0$).

The integrators $k_1 \cdots k_N$ thus yield a series of integrated signals $$\frac{1}{R_1C_1}\int_0^t [x_2-Z]y_1 dt, \frac{1}{R_2C_2}\int_0^t [x_2-Z]y_2 dt \ldots$$

$$\frac{1}{R_NC_N}\int_0^t [x_2-Z]y_N dt$$

These integrated signals are next passed through manually adjustable gain controls $p_1, p_2 \cdots p_N$ having gains $P_1, P_2 \cdots P_N$ which may be adjusted to control the response rate of the filter. The resultant series of integrated signals appearing at the output of the gain controls is $$K_1 \int_0^t [x_2-Z]y_1 dt, K_2 \int_0^t [x_2-Z]y_2 dt \ldots K_N \int_0^t [x_2-Z]y_N dt \quad (3)$$

where $$K_1 = \frac{P_1}{R_1 C_1} \ldots K_N = \frac{P_N}{R_N C_N}$$

The series of integrated signals of Equation 3 will be termed coefficients, for reasons that will appear shortly, and are represented in short form by $c_1, c_2 \cdots c_N$ respectively.

The coefficients $c_1 \cdots c_N$ are next multiplied in a set of multipliers $N_1 \cdots N_N$, by the respective components $y_1 \cdots y_N$ to yield a set of weighted components $c_1 y_1, c_2 y_2 \cdots c_N y_N$. These weighted components are then added in a conventional adder 12 to provide the output signal Z, which is thus given by $$z = \sum_{n=1}^{N} c_n Y_n \quad (4)$$

In the result, the filter 2 of FIGURE 1 takes the input signal $x_1$, breaks this signal down into a number of components, multiplies each component by a variable coefficient (i.e. the coefficients $c_1, c_2 \ldots c_N$) to obtain a series of weighted or scaled components (i.e. the components $c_1 y_1, c_2 y_2 \cdots c_N y_N$) and then adds these components to obtain the output signal Z.

In general, in an arrangement where a noisy input signal $x_1$ is broken down into components, each component being multiplied by a coefficient to produce a scaled component, and the scaled components are then added to produce an output signal Z, it is apparent that if the coefficients are assigned certain values, the noise degradation of the output signal will be a minimum as compared with the degradation at other values of the coefficients.

It is found that the filter 2 is such that the coefficients $c_n$ automatically seek optimum values at which the degradation of the output signal Z is a minimum, as compared with the degradation at other values of the coefficients. Thus, provided that the frequency spectrum of the input signal $x_1$ changes at a rate that is slow in comparison with the rate of change of the coefficient values, the coefficients will in fact adjust themselves approximately to these optimum values. This may be demonstrated as follows.

The noise degradation of output signal Z is defined (see Equations 1 and 2) as:

$$\overline{e_z^2} = \overline{[s-Z]^2} \quad (5)$$

Since here, signal Z is the sum of a number of scaled components $c_n y_n$, therefore $$\overline{e_z^2} = \overline{\left[s - \sum_{n=1}^{N} c_n y_n\right]^2} \quad (6)$$

To find the values of the coefficients $c_n$ for which the degradation $\overline{e_z^2}$ is a minimum, the right hand side of Equation 6 is differentiated with respect to $c_n$ and the other derivatives are set equal to zero, resulting in N equations.

$$\overline{sy_1 - \sum_{n=1}^{N} c_n y_n y_1} = 0$$

$$\vdots$$

$$\overline{sy_N - \sum_{n=1}^{N} c_n y_n y_N} = 0$$

which may more conveniently be written as $$\overline{sy_r - \sum_{n=1}^{N} c_n y_n y_r} = 0 \quad (r=1 \ldots N) \quad (7)$$

as the condition for a minimum degradation $\overline{e_z^2}$. (The component $y_r$ cannot be divided out since it may in time be equal to zero.)

In practice, signal $s$ is unavailable, but it is assumed that another noisy signal $x_2$ is available. In underwater seismic surveying, noisy signals $x_1$ and $x_2$ can be obtained from two hydrophones placed a sufficient distance apart so that the noise received by one is uncorrelated with the noise received by the other (since most of the degrading noise is localized in the vicinity of the hydrophone). Two such hydrophones are shown at 26, 28 in dotted lines in FIG. 1 as connected to inputs 4, 8. By placing the signal source (which may be a sparker or a pneumatic or explosive sound source) equidistant between the two hydrophones, the desired reflections will arrive at each simultaneously and thus the signal components of each hydrophone output will be the same. (Alternatively, a running average of received signals from the most recent transmissions may be stored in a buffer store and used as a reference, provided that the pulse repetition rate is high compared with the rate of change in the terrain being surveyed. Since successive transmissions occur at different times, the noise content of the sample received signals will be uncorrelated, unless the noise is synchronous with the pulse repetition interval.)

The second noisy signal $x_2$, which is simply the pure signal $s$ degraded by random noise $n_2$, may be expressed as:

$$x_2 = s + n_2, \text{ or } s = x_2 - n_2 \quad (7a)$$

Multiplying each side of Equation 7a by $y_r$ and averaging $$\overline{sy_2} = \overline{x_2 y_r} - \overline{n_2 y_r} \quad (7b)$$

Now, the average value of the random noise signal $n_2$ is simply zero, since the waveform of $n_2$ has equal areas above and below the zero axis. This is also true when $n_2$ is multiplied by some other signal, such as $y_r$ (provided that $y_r$ does not contain noise correlated with $n_2$, but this is specified to be the case). Therefore the average value of $n_2 y_r$ is zero, so that $$\overline{sy_r} = \overline{x_2 y_r} \tag{8}$$

Substituting Equation 8 in Equation 7, the conditions for a minimum degradation $a_Z^2$ are $$\overline{x_2 y_r - \sum_{n=1}^{N} c_n y_n y_r} = 0 \quad (r=1 \ldots N) \tag{9}$$

These conditions are in fact satisfied by the coefficients produced by the filter 2. From Equations 3 and 4, the coefficients produced by the filter are:

$$c_n = K_1 \int_0^t [x_2 - \sum_{n=1}^{N} c_n y_n] y_1 dt$$

$$\vdots$$

$$c_1 = K_N \int_0^t [x_2 - \sum_{n=1}^{N} c_n y_n] y_N dt$$

which may more conveniently be written as $$c_r = K_r \int_0^t [x_2 - \sum_{n=1}^{N} c_n y_n] y_r dt \quad (r=1 \ldots N) \tag{10}$$

To solve Equations 10 for the coefficients, Equations 10 are differentiated with respect to time, yielding $$\frac{1}{K_r} \frac{dc_r}{dt} = x_2 y_r - \sum_{n=1}^{N} c_n y_n y_r \quad (r=1 \ldots N) \tag{11}$$

As $t \rightarrow \infty$, the coefficients $c_r$ approach a constant value and their derivatives approach zero, so that taking the average value of both sides of Equations 11:

$$0 = \overline{x_2 y_r - \sum_{n=1}^{N} c_n y_n y_r} \quad (r=1 \ldots N) \tag{12}$$

In other words, at steady state, the coefficients $c_n$ generated the filter satisfy Equations 12, and since Equations 12 are the same as Equations 9, the coefficients generated by the filter satisfy, at steady state, the conditions for a minimum degradation $\overline{e_Z^2}$.

The number of bandpass networks used is largely a matter of choice, but a typical number that may be used is ten. In other words, there may be ten bandpass networks $h_1$ to $h_{10}$, ten multipliers $M_1$ to $M_{10}$, ten integrators $k_1$ to $k_{10}$, etc. (i.e. $N=10$). The networks $h_1$ to $h_{10}$ may be simple bandpass filters or they may be constituted by other linearly independent networks, such as the tapped outputs of a delay line, or simple lag networks, or Laquerre networks, or non-linear operators.

The setting time for the coefficients depends upon the gain of integrators $k_1, k_2 \ldots k_N$, and upon the gains $P_1, P_2 \ldots P_N$, i.e. it depends upon $K_1, K_2 \ldots K_N$, or upon the loop gain. It may be shown that with the linearly independent networks $h_1$ to $h_N$ discussed, the self-adjusting action of the coefficients is stable provided that the constants $k_1 \ldots K_N$ are greater than zero, and provided that the bandpass filters $h_1$ to $h_N$ are linearly independent. The setting time of the coefficients may be adjusted by the gain controls $p_1 \ldots p_N$, a larger gain yielding a faster setting time (with more ripple in the coefficients, however) and a similar gain yielding a slower setting time.

Figure 3A:
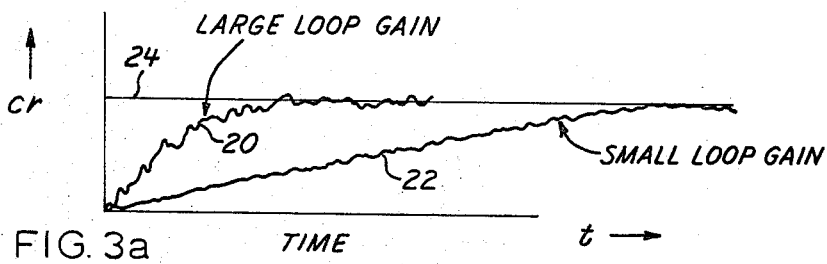
FIG. 3A shows typical trajectories for a coefficient $c_r$.
Figure 3:
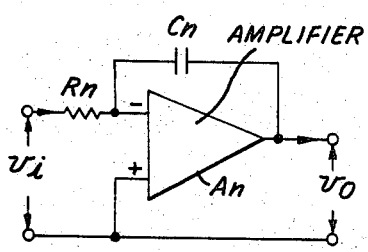
FIG. 3 shows a typical circuit for one of the integrators of the filter of FIG. 1.

The setting of the coefficients is illustrated in FIG. 3A which shows illustrative trajectories 20 and 22 for a coefficient $c_r$. In trajectory 20, the loop gain is fairly high, and the coefficient approaches an optimum value 24 more rapidly than in trajectory 22, where the loop gain is lower. However, with a higher loop gain, there is more ripple or variance in the coefficient value than is the case with a lower loop gain. The ripple is a result of the fact that finite (rather than infinite) averaging or integration intervals are used.

Figure 4:
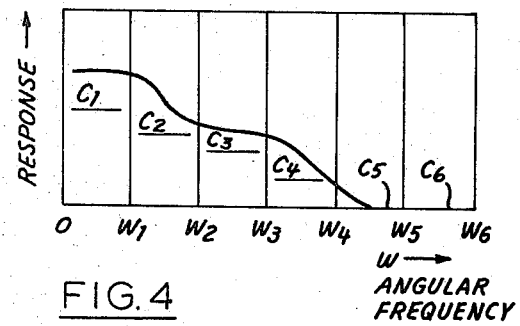
FIG. 4 shows a typical steady state frequency response for a six bandpass network filter.

A typical frequency response for a filter according to the invention and having six bandpass networks is shown in FIG. 4. In FIG. 4 it is assumed that the coefficients have reached approximately constant values, indicated on the drawing, and that the first bandpass network passes frequencies from near zero to $w1$, the second bandpass network passes frequencies from $w1$ to $w2$, etc. The resultant frequency response curve of the filter is indicated at 15 in the drawing.

In practice, the spectral characteristics of signals arriving at later times following the initiation of a pulse to be received is usually different from early arrivals, so the filter is usually optimum only over a small interval. Therefore, the filter will usually be used with a pulse source that produces a series of pulses. The filter will typically be adjusted so that the automatic setting operation of the parameters occurs over a predetermined time interval (which can be controlled by the operator) following the initiation of a pulse.

For example, in marine seismic work in which a pulse source is towed over the water surface and pulses are transmitted to the bottom, an event occurring e.g. between 50 and 60 milliseconds following transmission of a seismic pulse may be of particular interest. The operator then adjusts a control "set delay," to position a strobe mark at the 50 ms. part of the record. He then adjusts a second control, "set interval," to locate a second strobe mark at the 60 ms. part of the record. The self adjusting action which sets the filter parameters to their optimum value operates only during the 10 ms. interval between 50 and 60 ms. following a transmission. Outside this interval and between transmissions the parameters will hold their values.

Figure 5:
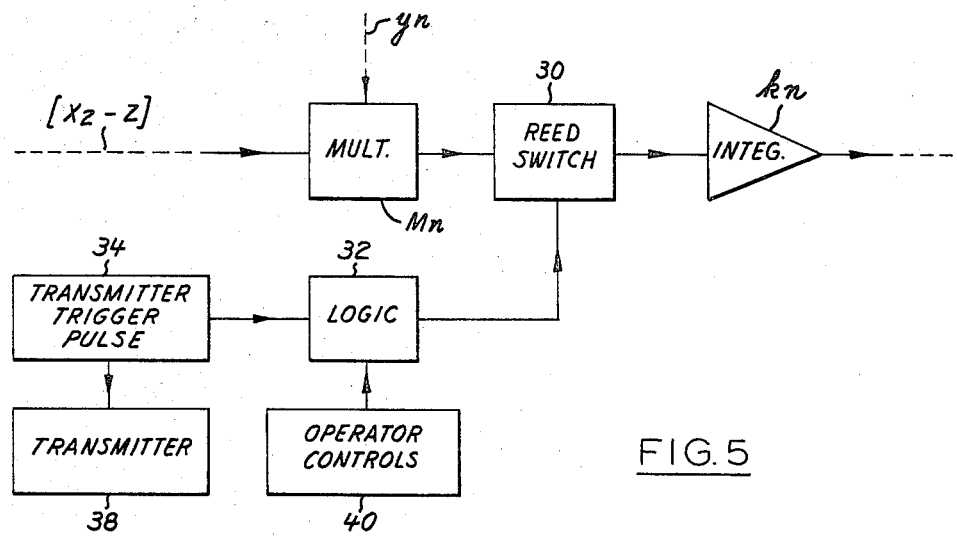
FIG. 5 shows in block diagram form the pertinent portions of a circuit for permitting the self adjusting action of the filter to occur only during predetermined periods following the transmission of a signal to be received.

This is achieved (FIG. 5) by inserting a fast acting reed relay switch 30 in series with each integrator input. The switches are actuated by logic pulses derived from a logic network 32 actuated from the transmitter trigger pulse. A source of transmitter pulses is shown diagrammatically at 34 in FIG. 5 as actuating a seismic sound source or transmitter 38. The timing of the logic pulses can be controlled by operator controls 40. At the end of the delay interval, start pulses are produced by the logic network to close the switches 30, and at the end of the desired interval, a stop pulse is produced to open the switches 30.

Figure 6:
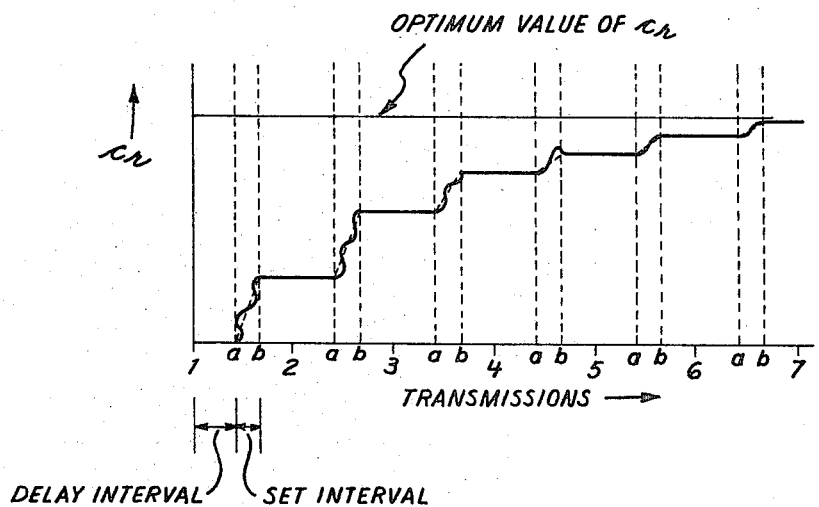
FIG. 6 shows the trajectory of a typical coefficient resulting from the apparatus of FIG. 5.

With this arrangement, the trajectory of a coefficient will typically appear as shown in FIG. 6, where the numerals 1, 2, 3, 4, 5, 6, 7 indicate transmissions, "a" indicates the end of the delay interval, and the occurrence of the start pulse, and "b" indicates the end of the set interval and the occurrence of the stop pulse. During the set interval the coefficient seeks its optimum value; between such intervals its value remains approximately constant.

What I claim as my invention is:

1. A variable parameter filter comprising:
   (a) a first input means for receiving an input signal $x_1$ to be filtered, said input signal comprising a desired pure signal degraded by random noise,
   (b) a second input means for receiving a reference signal $x_2$, said reference signal comprising said pure signal degraded by random noise uncorrelated with said first mentioned random noise,
   (c) output means for supplying an output signal Z,
   (d) and generating means for generating said output signal, said generating means comprising
      (1) signal subdividing means, connected to said first input means, for subdividing said input signal $x_1$ into a plurality of component signals $y_1$ to $y_N$, each said component signal spanning a frequency band differing at least in part from the frequency bands spanned by the other component signals, (2) means, connected to said signal subdividing means, said second signal input means, and said output means, for generating, from said component signals, said reference signal and said output signal, a plurality of coefficients $c_1$ to $c_N$, one such coefficient associated with each component signal $y_1$ to $y_N$, each coefficient $c_n$ of said coefficient $c_4$ to $c_N$ being proportional to $$\int_0^t [x_2 - Z]y_n dt$$

where $y_n$ is the component signal associated with the coefficient $c_n$, and $n$ is a number from 1 to N, (3) means for multiplying each component signal by its associated coefficient to produce a set of weighted component signals $c_1 y_1$ to $c_N y_N$, (4) adding means for adding said weighted component signals to produce a sum signal $$\sum_{n=1}^{N} c_n y_n$$

(5) and means for coupling said adding means to said output means for said sum signal to constitute said output signal Z, whereby said coefficients will seek values that reduce the noise content of said signal Z, as compared with the noise content of said signal Z at other values of said coefficients, provided that the frequency spectrum of said input signal changes at a rate that is slow in comparison with the rate of change of said coefficients.

2. Apparatus according to claim 1 wherein said means (d)(2) comprises:

(i) means for producing a difference signal equal to the difference between said output and reference signals, (ii) means for multiplying each component signal by said difference signal to produce a plurality of first product signals, one such first product signal thus being associated with each component signal, (iii) means for integrating each said first product signal with respect to time to produce a plurality of integrated signals, one said integrated signal thus being associated with each component signal, said coefficients being proportional to said integrated signals.

3. Apparatus according to claim 2 wherein said means for integrating said first product signals comprises a plurality of integrators, one for each product signal, the gain of each integrator being greater than zero and positive.

4. Apparatus according to claim 3 wherein said signal subdividing means comprises a plurality of bandpass filters, said bandpass filters together having a frequency response substantially spanning the frequencies of interest in said input signal, and the individual frequency responses of said bandpass filters being substantially non-overlapping.

5. Apparatus according to claim 3 including a pair of hydrophones, one connected to each of said input means, said hydrophones being spaced apart so that the random noise received at one hydrophone will be largely uncorrelated with the random noise received at the other hydrophone.

6. Apparatus according to claim 3 including a plurality of switches, one switch in series with the input of each integrator, said switches being operable to control the time periods during which said coefficients seek said values to reduce the noise content of said signal Z.

7. Apparatus according to claim 6 including trigger means for generating a trigger pulse, transmitting means responsive to said trigger pulse for generating a signal pulse to be received; and logic means coupled to said trigger means and responsive to said trigger pulse to produce a start pulse at a predetermined interval after said trigger pulse to close said switches to permit said coefficients to seek optimum values, and to produce a stop pulse at a predetermined interval after said start pulse to close said switches to terminate the optimization of said coefficients until the next start pulse following the next trigger pulse.

References Cited

UNITED STATES PATENTS 2,966,584  12/1960  Isley.

RODNEY D. BENNETT, *Primary Examiner.*

D. C. KAUFMAN, *Assistant Examiner.*

U.S. Cl. X.R.

235—181; 328—167; 340—3